Patented June 20, 1933

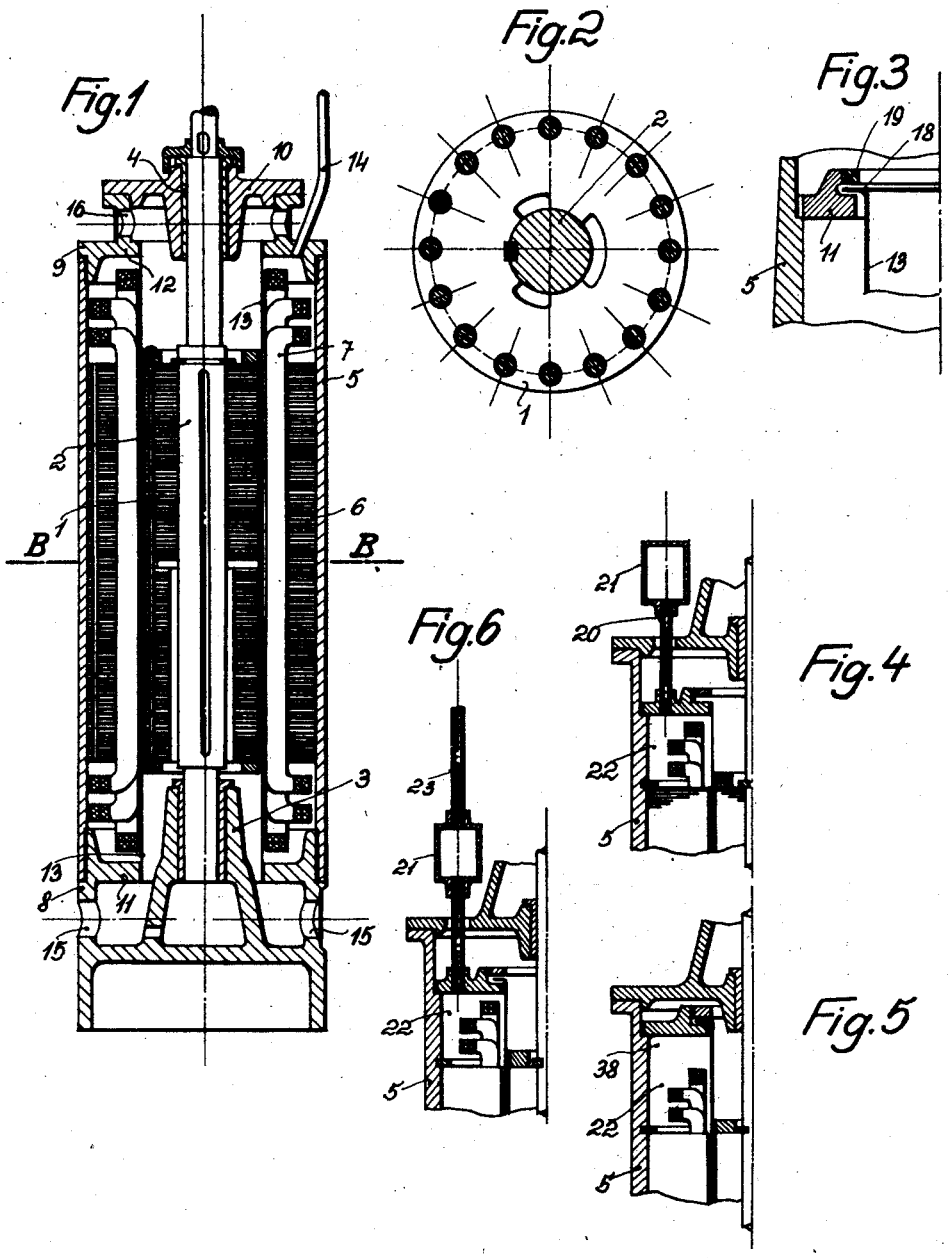

1,914,714

UNITED STATES PATENT OFFICE

RICHARD GOLD AND JULIUS SCHMAUSS, OF VIENNA, AUSTRIA

ELECTROMOTOR

Original application filed June 25, 1929, Serial No. 373,588, and in Austria July 16, 1928. Divided and this application filed July 3, 1930. Serial No. 465,569.

Our invention relates to improvements in electric motors.

This application is a division of U. S. patent application Serial No. 373,588, filed June 25, 1929, and disclosing the same generic invention.

Efforts have already been made, by various ways and means, to solve the problem of constructing electric motors which are to serve, for instance, for driving pumps, in such way that they can operate direct in the water or other liquid to be raised without having to fear break-downs. It has been suggested for instance to insert a fluid tight partition in the form of a thin walled tube in the space between the stator and rotor of the electric motor (particularly in the case of three-phase motors with squirrel-cage rotors), which tube closes tightly around the casing of the stator, so that the winding of the stator is then completely closed in. The hollow space of circular annular section containing the stator was to be filled with an insulating oil, and as the rotor can be so produced as to be unaffected by water or other fluids, such a motor can be plunged into the liquid which is to be delivered by the pump driven by the motor straight away.

Now the object of the present invention is to make the partition between rotor and stator as thin as possible in order that quite a narrow space between rotor and stator shall suffice to take this partition, thus enabling the dimensions of the parts of the motor coming into question to be reduced as far as possible.

The tube inserted in the space between rotor and stator may consist of a suitable metal, or metal alloy produced with a thickness of wall being only a small fraction of a millimeter. Of course, a tube with such thin walls is easily deformed, and means must be provided to prevent such deformation if the certainty of operation of the electric motor is to be maintained; the rotor must be prevented from coming into contact with the thin plate tube, as in such case it would soon be destroyed, which would consequently in turn destroy the sealing of the stator chamber, in which is to be found the winding connected with the system.

The thin partition tube is subjected, on the one hand from the space in which the rotor is located, to the hydrostatic pressure of the liquid in which the motor works, and on the other hand, from the space in which the stator winding is to be found, to the pressure of the medium filling the hollow space of the stator, which medium expands consequent on the heat generated during operation. In order to avoid a detrimental deformation of the thin tubular partition care must be taken to see either that the parts forming the stator chamber and contents thereof, including the substance filling the hollow space can expand as freely as possible under the influence of the heat generated in operation, or that the expansions caused by the heat of all these parts is so small that practically they need not be taken into consideration. These two main possibilities can also be simultaneously turned to account with one another.

Care must also be taken to see that the thin partition-tube which seals the stator chamber from the rotor is less susceptible to compressive stresses which emanate from the space in which the rotor operates than to compressive stresses which emanate from the interior of the stator chamber. Every tube is, of course, more easily able to take up internal pressure than external pressure, as the wall of such a tube is mainly under tensile stress from the internal pressure, while any pressure taking effect from the outside tends to cause the wall of the tube to collapse inwards. In the case of an extremely thin walled tube as is to be used here, this difference in the capacity for withstanding internal and external pressure is naturally emphasized.

It will be seen from this that care must be taken to avoid high pressure taking effect on the thin-walled tubular partition from the stator chamber and that if the difference between this pressure and the hydrostatic pressure taking effect from the other side is able to deform the tube towards the rotor, it will necessarily quickly be destroyed as a consequence of the friction of the rotor.

According to our invention the stator chamber in which the stator winding is to be found, is filled with a gaseous medium. By using such a filling medium we avoid many drawbacks caused by liquid filling media which have been suggested heretofore. Also the compressibility of gases permits to easily regulate the pressure thereof in any desired manner.

In order that our invention may be the better understood, we will now proceed to describe the same in relation to the accompanying drawing, reference being had to the letters and figures marked thereon; like letters refer to like parts in the various figures in which:—

Fig. 1 is an axial section through a motor constructed according to our invention;

Fig. 2 a cross section through the rotor of the said motor drawn on an enlarged scale and taken on the line B—B of Figure 1;

Fig. 3 shows means for tightly fixing the ends of the thin-walled tubular partition;

Fig. 4 is an axial section of a modification of the motor with parts broken away;

Fig. 5 is an axial section of a further modification of the motor with parts broken away; and Fig. 6 shows a modification of Fig. 4, wherein an open pipe is connected up with the expansion chamber.

The rotor 1 is carried on the shaft 2, which is housed in the bearings 3 and 4 of the casing 5. This housing 5 also encloses the stator 6 with its windings 7 and consists in this case of a tubular part and end pieces 8 and 9, the end piece 9 being closed by a cover 10 containing the bearing 4. The end pieces 8 and 9 have flanges 11 and 12 respectively, a thin-walled partition tube 13 being tightly mounted in the inner periphery thereof. By this means a chamber of circular annular section, closed on all sides, is formed inside the casing 5 by the two flanges 11 and 12 and the thin-walled partition tube 13, inside which chamber the stator with its windings is enclosed. The current conducting cable 14 of the stator can be passed through in a perfectly tight and simple manner at any point of the casing. The end pieces 8 and 9 of the housing may be provided with apertures 15 and 16, respectively, through which water can penetrate from outside into the room of the rotor. These apertures 15 and 16 also may be provided with filters or may be entirely omitted.

Fig. 3 shows the manner in which the thin-walled partition tube 13 is tightly closed to the stator casing. Each end of the cylindrical wall 13 is provided with a flange 18 which is placed against the flanges 11 and 12, respectively, of the motor casing 5 and fixed thereto by the pressure ring 19.

In accordance with our invention the stator chamber is filled with gaseous substances. As a gaseous filling substance even air may be used, or alternatively any gas, naturally of a non-injurious nature, may be introduced.

If the motor is to operate at only a slight depth in a liquid, the hydrostatic pressure taking effect on the thin tubular partition will also be comparatively low, so that the partition tube is easily able to take this pressure. It is however often necessary to provide for greater alterations in volume in the interior of the stator chamber, which alterations are due to the expansion of the gaseous filling substance as a consequence of the heating in working.

So long as the pressure arising hereby in the interior of the stator chamber is not greater than the hydrostatic pressure of the surrounding liquid taking effect from the other side on the thin-walled partition tube, no risk will exist of an undue stress being put upon the tubular partition. If, however, an excess of pressure arises in the interior of the stator chamber beyond the hydrostatic pressure, the thin partition-tube may very easily be pressed in, and the consequence of this would be that the rotor would rub on the tubular partition and grind through the latter in a short time.

Now in order to prevent any such increase in pressure in the stator chamber, devices can be provided which ensure an automatic regulation of the pressure inside the stator chamber.

It may for instance be advisable to connect up with the stator chamber gas-filled expansion vessels, which may have rigid walls and which only fulfil the purpose of placing greater space at disposal for the filling medium contained in the stator chamber, so that the increasing pressure in the interior of the stator chamber as a consequence of the expansion of the filling medium by heat cannot rise to an inadmissable degree. Such gas-filled expansion chambers with rigid walls render a compensation of pressure possible in a simple manner.

Such expansion chambers can be arranged either inside or outside the motor casing or an enlargement of the motor casing itself may fulfil this object.

Fig. 4 shows by way of example a vertical arrangement, wherein an expansion vessel 21 with rigid walls is placed outside the motor casing 5 and communicates with the stator chamber 22 by means of the pipe 20. The gaseous filling medium fills up the stator chamber 22, the pipe 20 and the interior of the expansion vessel 21.

In Fig. 5 an enlargement of the motor casing 5 itself serves as expansion chamber, the room 38 fulfilling the object of the expansion vessel 21 shown in Fig. 4.

It is also possible as illustrated by Fig. 6, to connect up with the stator chamber 22 an open pipe 23 emerging from the surface of the external liquid. One or more enlargements 21 may also be inserted in such emergent pipe.

In many cases it is advisable to produce a pressure below that of the atmosphere in the stator chamber, namely a pressure which, so long as the normal temperature rules in the stator chamber, is less than the hydrostatic pressure of the external liquid or less than the external atmospheric pressure. In this connection it is possible to arrange the conditions in such manner that if any increase in pressure arises during the working as a consequence of the heating, the ensuing pressure either does not exceed the hydrostatic pressure of the external liquid or not beyond defined limits.

The use of a pressure below that of the atmosphere can also be combined with the use of gas-filled expansion chambers as described above, which renders it possible to make the dimensions of these expansion chambers very small. By choosing a pressure sufficiently below that of the atmosphere, such expansion chambers are naturally not necessary at all.

Any such pressure below that of the atmosphere in the interior of the stator chamber naturally also carries with it the consequence that the walling of the thin partition-tube is kept continually pressed tightly to the stator plate supporting it which is of great advantage as in this case the thin partition tube is secured against any contact with the rotor.

The gas filler must not fill up the entire stator chamber in any case. Sometimes it will be advantageous to fill this chamber partly with a gas and partly with a liquid, whereby it is obtained that the liquid filler can freely expand under the influence of heat into the space kept by the gas filler.

If the motor is intended to be plunged to any considerable depth, the hydrostatic pressure of the fluid surrounding it may be so great as to prevent the thin-walled partition tube withstanding it without counter-pressure from the interior of the stator chamber. Care is therefore to be taken that as perfect a compensation of pressure as possible on both sides of the walling of the partition-tube is obtained, in which connection it is naturally also necessary to take into consideration the variability of the pressure in the interior of the stator chamber as a consequence of the expansion from heat occurring during operation. All the means described above may be used for the regulation of pressure in the interior of the stator chamber.

The motors designed according to our invention may be used for the direct drive of pumps plunged into water, into crude oil (oil wells) or such like can be arranged both with vertical and horizontal shafts.

Having now particularly described and ascertained the nature of our said invention and in what manner the same is to be performed, we declare that what we claim is:—

1. An electric motor adapted to be used under water or other liquid, comprising a rotor, a stator, a casing surrounding said stator, an imperforate metallic partition-tube, thinner than one millimeter, arranged in the air gap between said stator and rotor and forming with said casing a liquid-tight stator chamber of substantially annular cross-section, and a gaseous filling medium in said stator chamber.

2. An electric motor adapted to be used under water or other liquid, comprising a rotor, a stator, a casing surrounding said stator, an imperforate metallic partition-tube, thinner than one millimeter, arranged in the air gap between said stator and rotor and forming with said casing a liquid-tight stator chamber of substantially annular cross-section, and a gaseous filling medium in said stator chamber, the gas pressure therein, even at the maximum temperature-rise of the motor, being sufficiently low to prevent the said partition-tube from being materially deformed.

3. An electric motor as set forth in Claim 2, in which the gas pressure in the said stator chamber, even at the maximum temperature-rise of the motor, only exceeds the pressure outside of the said partition-tube by so slight a degree that no risk exists of the thin partition-tube being pressed in.

4. An electric motor adapted to be used under water or other liquid, comprising a rotor, a stator, a casing surrounding said stator, an imperforate metallic partition-tube, thinner than one millimeter, arranged in the air gap between said stator and rotor and forming with said casing a liquid-tight stator chamber of substantially annular cross-section, and a gaseous filling medium in said stator chamber, the gas pressure therein even at the maximum temperature-rise, being always lower than the pressure outside the said partition-tube.

5. An electric motor as set forth in Claim 1, having at least one expansion chamber of suitable size, which is provided with rigid walls, filled with a gaseous medium, and communicating with the said stator chamber.

6. An electric motor adapted to be used under water or other liquid, comprising a rotor, a stator, a casing surrounding said stator, an imperforate metallic partition tube, thinner than one millimeter, arranged in the air gap between said stator and rotor and forming with said casing a liquid-tight stator chamber of substantially annular cross-section, a gaseous filling medium in said stator chamber, and at least one expansion chamber formed as an integral enlargement of the motor casing itself, filled with a gaseous medium, and communicating with the said stator chamber.

7. An electric motor adapted to be used under water or other liquid, comprising a rotor, a stator, a casing surrounding said stator, an imperforate metallic partition-tube, thinner than one millimeter, arranged in the air gap between said stator and rotor and forming with said casing a liquid-tight stator chamber of substantially annular cross-section, a gaseous medium filling partly said stator chamber, and a liquid filling the remaining part of the said stator chamber.

In testimony whereof we affix our signatures.

RICHARD GOLD.
JULIUS SCHMAUSS.